Patented May 16, 1950

2,508,278

UNITED STATES PATENT OFFICE 2,508,278

METHOD OF MAKING A GAS ABSORBENT FOR CORROSIVE GASES FORMED IN ELECTRICAL APPARATUS

Joseph Levy, Willesden Junction, London, England, assignor to Rotax Limited, London, England No Drawing. Application November 19, 1945, Serial No. 629,720. In Great Britain November 6, 1944

1 Claim. (Cl. 252—190)

This invention has for its object to provide improved means for absorbing corrosive gases formed in electrical apparatus, and particularly the gases formed in the interrupter and distributor housings of high tension ignition apparatus.

The invention consists of a porous body impregnated with an absorbent medium.

In particular the invention consists of a felt or other porous body impregnated with turpentine or a mixture of turpentine with urea, oleic acid, or manganese dioxide, or any combination of these latter substances.

Also the invention consists of an impregnated body as specified in either of the preceding paragraphs, and having incorporated with it a medium which by change of colour indicates when the absorbent substance has become exhausted.

Alternatively the invention consists of a felt or other porous body impregnated with a mixture of American oil of turpentine, triethanolamine or other emulsifying agent, urea, potassium iodide, sodium thiosulphate, water and starch solution.

In one manner of carrying the invention into effect, I employ a small felt pad adapted to be mounted in the interrupter or distributor housing of a high tension electrical ignition apparatus for use with an internal combustion engine. This pad is impregnated with American oil of turpentine, or with a mixture of such oil with urea, oleic acid, or manganese dioxide or any combination of these latter substances. The manganese dioxide may be incorporated with the pad by first saturating the latter with a solution of manganese sulphate, and then with potassium permanganate, the soluble potassium sulphate being subsequently dissolved out, leaving solid manganese dioxide in the interstices of the pad. The pad is then soaked with the turpentine, with or without any of the other substances above mentioned.

Alternatively I soak a felt pad in a 60% solution of calcium chloride in water and then dry in an oven at about 110° C. The pad is then immersed in a 20% solution of ammonium carbonate made ammoniacal with ammonia and allowed to soak for about one hour. By this means the pad becomes loaded with insoluble calcium carbonate. After washing with water to remove insoluble chlorides the pad is again dried. The following solutions are then mixed in the proportion of 10 c. c. of each.

15% urea in water
30% sodium thiosulphate in water
2% potassium iodide in water.

To this mixture is added 1 c. c. of triethanolamine, or sulphonated castor oil, or other suitable emulsifier, 1 c. c. of soluble starch solution and 10 c.c. of turpentine. The pad is impregnated with this mixture and then dried.

In the first example it is advantageous to add to the impregnant any suitable indicator which by change of colour can show when the impregnant has become exhausted by the absorbed corrosive gases. Any of a variety of known indicators may be used for this purpose, such as for example, the leuco compound of fluorescein, Eosin, malachite green, or alizarine S. For pads not saturated with manganese dioxide, manganous chloride may be used as the indicator.

In the second example, the addition of an indicator is super-fluous, as on exhaustion of the thiosulphate, free iodine is liberated and will cause a change of colour.

Instead of a felt pad, I may use a porous block of any convenient inert solid such as, for example, fuller's earth, kaolin, wood flour, activated charcoal, glass wool, synthetic resin which has been frothed before final polymerisation, or rubber. Also any other appropriate substance or mixture of substances may be used as the absorbent medium.

When it is required to mount the pad on a rotary element contained in the chamber in which corrosive gases can be generated, I seal a part or parts of the pad by means of a coating of wax, or a metal covering arranged to prevent the impregnant from being flung out by centrifugal action.

Whilst the invention is primarily intended for the specific purposes above mentioned, it may be applied to other analogous uses.

Having thus described my invention what I claim as new and desire to secure by Letters Patent is:

The method of making a gas absorbent pad adapted for use in electrical apparatus that emits corrosive gases that includes the steps of impregnating a felt pad with calcium chloride, drying it at elevated temperature, immersing it in ammoniacal ammonium carbonate, washing solubles out and drying, impregnating it with a solution of 10 parts 15% urea, 10 parts 30% sodium thiosulfate, 10 parts 2% potassium iodide, 1 part emulsifier, 1 part soluble starch, and 10 parts turpentine, and drying.

JOSEPH LEVY.

REFERENCES CITED

The following references are of record in the file of this patent:

UNITED STATES PATENTS

| Number | Name | Date |
|---|---|---|
| 500,252 | Frasch | June 27, 1893 |
| 1,349,910 | Pratt | Aug. 17, 1920 |
| 1,468,380 | French | Sept. 18, 1923 |
| 1,537,519 | Yablick | May 12, 1925 |
| 1,649,326 | Schneider | Nov. 15, 1927 |
| 1,716,479 | Bilsky | June 11, 1929 |
| 2,105,407 | Clark | Jan. 11, 1938 |
| 2,121,793 | Goshorn et al. | June 28, 1938 |
| 2,400,709 | Patrick | May 21, 1946 |

OTHER REFERENCES

Gregory, "Uses and Applications of Chemicals and Related Materials," Reinhold Pub. Corp., N. Y. C., N. Y. (1939), pp. 486, 614, 627 and 629.

Hackh's Chemical Dictionary, 3rd edition, pages 875 and 876, The Blackiston Co., Phila., Penna.